United States Patent
Takano et al.

[11] Patent Number: 6,058,728
[45] Date of Patent: May 9, 2000

[54] REFRIGERANT CYCLE FOR VEHICLE AIR CONDITIONER

[75] Inventors: Yoshiaki Takano, Kosai; Satoshi Izawa, Kariya, both of Japan

[73] Assignee: DENSO Coporation, Kariya, Japan

[21] Appl. No.: 09/257,290

[22] Filed: Feb. 25, 1999

[30] Foreign Application Priority Data

Mar. 12, 1998 [JP] Japan ................................. 10-061533

[51] Int. Cl.⁷ .................................................. F25B 41/00
[52] U.S. Cl. .............................. 62/196.4; 62/159; 62/505
[58] Field of Search .................................. 62/196.4, 197, 62/208, 209, 81, 505, 159

[56] References Cited

U.S. PATENT DOCUMENTS

| | | | |
|---|---|---|---|
| 3,060,699 | 10/1962 | Tinley | 62/196 |
| 3,134,241 | 5/1964 | Johnson | 62/196 |
| 3,201,950 | 8/1965 | Shrader | 62/197 |
| 3,435,626 | 4/1969 | Wile et al. | 62/196 |
| 4,770,000 | 9/1988 | Kuroda et al. | 62/156 |
| 4,785,640 | 11/1988 | Naruse | 62/196.4 |
| 5,070,707 | 12/1991 | Ni | 62/234 |
| 5,168,715 | 12/1992 | Nakao et al. | 62/181 |
| 5,291,941 | 3/1994 | Enomoto et al. | 165/62 |
| 5,404,729 | 4/1995 | Matuoka et al. | 62/179 |
| 5,477,700 | 12/1995 | Iio | 62/231 |
| 5,555,744 | 9/1996 | Hirano | 62/352 |
| 5,584,186 | 12/1996 | Hirano | 62/196.4 |

*Primary Examiner*—Henry Bennett
*Assistant Examiner*—Marc Norman
*Attorney, Agent, or Firm*—Harness, Dickey & Pierce, PLC

[57] ABSTRACT

In a refrigerant cycle having a gas refrigerant bypass passage through which high-temperature gas refrigerant is introduced from a compressor into an evaporator while bypassing a condenser, a super-heating degree of gas refrigerant discharged from the compressor is determined according to signals from a pressure sensor and a temperature sensor disposed at a refrigerant discharging side of the compressor. According to the super-heating degree of gas refrigerant discharged from the compressor, refrigerant staying in the condenser is controlled so that refrigerant amount circulating in the refrigerant cycle is suitably controlled. Thus, heating capacity of the refrigerant cycle using the gas refrigerant bypass passage is improved, while the compressor is protected.

12 Claims, 3 Drawing Sheets

REFRIGERANT CYCLE FOR VEHICLE AIR CONDITIONER

CROSS-REFERENCE TO RELATED APPLICATION

This application is related to and claims priority from Japanese Patent Application No. Hei 10-61533 filed on Mar. 12, 1998, the contents of which are hereby incorporated by reference.

BACKGROUND OF THE INVENTION

1. Field of the Invention

The present invention relates to a refrigerant cycle having a gas refrigerant bypass passage through which gas refrigerant discharged from a compressor is introduced into an evaporator after being decompressed, while bypassing a condenser. More particularly, the present invention relates to a refrigerant cycle for a vehicle air conditioner, in which refrigerant amount circulating in the refrigerant cycle is suitably controlled according to super-heating degree (SH) of refrigerant discharged from the compressor.

2. Description of Related Art

In a conventional vehicle air conditioner, hot water (engine-cooling water) circulates in a heating heat exchanger during a heating mode, and air blown into a passenger compartment is heated by the heating heat exchanger. When temperature of hot water is low, air blown into the passenger compartment is not sufficiently heated by the heating heat exchanger.

To overcome the problem, a refrigerant cycle having a gas refrigerant bypass passage is described in JP-A-5-272817. In the conventional refrigerant cycle, when temperature of hot water flowing into the heating heat exchanger is lower than a predetermined temperature, gas refrigerant discharged from the compressor is directly introduced into an evaporator while bypassing a condenser, so that air passing through the evaporator is heated by gas refrigerant introduced into the evaporator. Further, a pressure of refrigerant discharged from the compressor or a super-heating degree of refrigerant at an outlet of the evaporator is detected, and it is determined whether refrigerant amount circulating in the refrigerant cycle is excess or deficient. However, the pressure of refrigerant discharged from the compressor is changed in accordance with refrigerant-cycle condition such as heat load of the refrigerant cycle, a rotation speed of the compressor, a decompressed degree of a decompression unit disposed in the gas refrigerant bypass passage. Therefore, it is difficult to accurately control the refrigerant amount by only the pressure of refrigerant discharged from the compressor.

SUMMARY OF THE INVENTION

In view of the foregoing problems, it is an object of the present invention to provide a refrigerant cycle having a bypass passage through which gas refrigerant discharged from a compressor is directly introduced into a heat exchange after being decompressed, while bypassing a condenser. In the refrigerant cycle having the bypass passage, heating capacity of heat exchanger using the bypass passage is improved, while the compressor is protected.

According to the present invention, in a refrigerant cycle, a bypass passage through which refrigerant discharged from a compressor is introduced into a heat exchanger while bypassing a condenser is provided. A valve unit is disposed in the refrigerant cycle to switch a communication between a discharge port of the compressor and an inlet of the condenser and to switch a communication between the discharge port of the compressor and the bypass passage. A super-heating signal detecting unit for detecting a signal corresponding to a super-heating degree of refrigerant discharged from the compressor is provided in a refrigerant discharge side of the compressor, and the super-heating degree is determined based on the signal from the super-heating signal detecting means by a control unit. Further, the control unit controls the valve unit to control refrigerant amount compressed in the compressor according to the super-heating degree. In the refrigerant cycle, because the super-heating degree of refrigerant discharged from the compressor is controlled in a predetermined range, refrigerant amount circulating in the refrigerant cycle can be maintained in a predetermined range during a bypass mode where refrigerant introduced from the compressor into the heat exchanger through the bypass passage is cooled in the heat exchanger. As a result, it is possible to return a predetermined amount of liquid refrigerant to a refrigerant suction side of the compressor, and heating capacity of the heat exchanger can be improved during the bypass mode.

During the bypass mode, the value unit closes the condenser and opens the bypass passage when the super-heating degree is in a range between a first predetermined value and a second predetermined value larger than the first predetermined value, so that the refrigerant amount circulating in the refrigerant cycle can be readily suitably controlled in the predetermined range. During the bypass mode in the refrigerant cycle, when the super-heating degree is smaller than the first predetermined value, it is determined that the refrigerant amount circulating in the refrigerant cycle is excess, and the valve unit opens the condenser so that a part of refrigerant discharged from the compressor is introduced into the condenser. Thus, the refrigerant amount circulating in the refrigerant cycle can be suitably reduced, and it can prevent a large amount of liquid refrigerant is compressed in the compressor. On the other hand, when the super-heating degree is larger than the second predetermined value, it is determined that the refrigerant amount circulating in the refrigerant cycle is insufficient, and the valve unit closes the bypass passage and opens the condenser so that refrigerant staying in the condenser is discharged into the heat exchanger. Thus, the liquid refrigerant amount returning to the refrigerant suction side of the compressor is suitably controlled so that the heating capacity of the refrigerant cycle is improved while it can prevent the temperature of refrigerant from being extremely increased. As a result, heating capacity of the heat exchanger is improved during the bypass mode, while the compressor is protected in the refrigerant cycle.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings.

Figure 1:
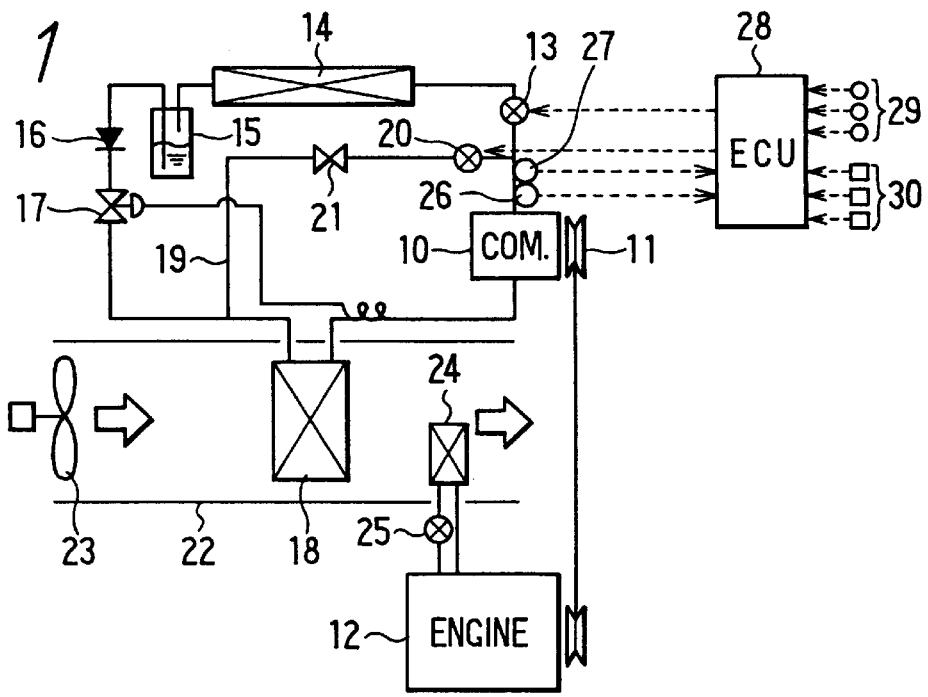
FIG. 1 is a diagrammatic view of a refrigerant cycle for a vehicle air conditioner according to a preferred embodiment of the present invention.

In the embodiment of the present invention, a refrigerant cycle is typically applied to a vehicle air conditioner. As shown in FIG. 1, a compressor 10 is driven by an engine 12 of the vehicle through an electromagnetic clutch 11. A refrigerant discharging side of the compressor 10 is connected to a condenser 14 through a first electromagnetic valve 13, and a refrigerant discharging side of the condenser 14 is connected to a receiver 15. In the receiver 15, gas refrigerant is separated from liquid refrigerant, and liquid refrigerant is stored therein.

A refrigerant discharging side of the receiver 15 is connected to a thermal expansion valve (i.e., first decompressing unit) 17 through a check valve 16. A refrigerant discharging side of the thermal expansion valve 17 is connected to an evaporator 18 (i.e., heat exchanger), and a refrigerant discharging side of the evaporator 18 is connected to a refrigerant suction side of the compressor 10. The thermal expansion valve 17 adjusts an amount of refrigerant flowing into the evaporator 18 so that a super-heating degree of refrigerant at the refrigerant discharging side of the evaporator 18 is controlled to a predetermined value.

A gas refrigerant bypass passage 19 is provided between the refrigerant discharging side of the compressor 10 and a suction side of the evaporator 18. Through the gas refrigerant bypass passage 19, gas refrigerant having a high temperature, discharged from the compressor 10, bypasses the condenser 14, for example. A second electromagnetic valve 20 and a second decompressing unit 21 are disposed in the refrigerant bypass passage 19. In the embodiment of the present invention, the second decompressing unit 21 is a capillary tube.

The evaporator 18 is disposed in an air conditioning case 22 forming an air passage. Air blown by a blower 23 is cooled by the evaporator 18 during a cooling mode in the summer. On the other hand, during a heating mode in the winter, gas refrigerant having a high temperature, discharged from the compressor 10, flows into the evaporator 18 through the gas refrigerant bypass passage 19, so that air is heated by the evaporator 12. In this case, the evaporator 12 is used as a radiator.

A heating heat exchanger 24 is disposed in the air conditioning case 22 at a downstream air side of the evaporator 18. The heating heat exchanger 24 heats air passing therethrough using hot water (engine cooling water) from the engine 12 as a heating source. Further, an outlet through which conditioned air is blown into a passenger compartment of the vehicle is provided in the air conditioning case 22 at a downstream air side of the heating heat exchanger 24. A hot water valve 25 is provided in a hot water circuit through which hot water flows between the engine 12 and the heating heat exchanger 24, and amount of hot water flowing into the heating heat exchanger 24 is controlled by the hot water valve.

A pressure sensor 26 for detecting pressure of gas refrigerant discharged from the compressor 10 and a temperature sensor 27 for detecting temperature of the gas refrigerant discharged from the compressor 10 are disposed in the refrigerant discharging side of the compressor 10. In the embodiment of the present invention, super-heating degree of gas refrigerant discharged from the compressor 10 can be detected by the pressure sensor 26 and the temperature sensor 27. Signals detected by the pressure sensor 26 and the temperature sensor are input into an electronic control unit (ECU) 28, and opening degrees of the first and second electromagnetic valves 13, 20 are controlled by the ECU 28.

Signals from a sensor group 29 and signals from operation switches 30 of an operation panel are input into the ECU 28, and operations of components such as the electromagnetic clutch 11, the blower 23 and the hot water valve 25 can be controlled by the ECU 28.

Next, operation of the refrigerant cycle for the vehicle air conditioner will be now described. During the cooling mode, the first electromagnet valve 13 is opened and the second electromagnetic valve 20 is closed by the ECU 28. Therefore, when the compressor 10 is driven by the engine 12, gas refrigerant discharged from the compressor 10 flows into the condenser 14 through the first electromagnet valve 13. Gas refrigerant from the compressor 10 is cooled and condensed in the condenser 14 by outside air blown by a cooling fan. The condensed refrigerant from the condenser 14 is separated into gas refrigerant and liquid refrigerant in the receiver 15, and only liquid refrigerant from the receiver 15 flows into the thermal expansion valve 17 after passing through the check valve 16. The liquid refrigerant from the receiver 15 is decompressed in the thermal expansion valve 17 into gas-liquid two-phase refrigerant having a low temperature and a low pressure. The gas-liquid two-phase refrigerant from the thermal expansion valve 17 flows into the evaporator 18, and is evaporated by absorbing heat from air blown by the blower 23. Therefore, air passing through the evaporator 18 is cooled, and is blown into the passenger compartment to cool the passenger compartment. Gas refrigerant evaporated in the evaporator 18 is sucked into the compressor 10, and is compressed in the compressor 10.

On the other hand, during the heating mode, the first electromagnetic valve 13 is closed and the second electromagnetic valve 20 is opened by the ECU 20. Therefore, the gas refrigerant bypass passage 19 is opened. Thus, high-temperature high-pressure gas refrigerant (i.e., super-heating gas refrigerant) discharged from the compressor 10 is decompressed in the decompressing unit 21, and the decompressed gas refrigerant having a high temperature is cooled in the evaporator 18 by air passing through the evaporator 18. Therefore, air passing through the evaporator 18 is heated by radiated heat from the refrigerant, and can be re-heated by the heating heat exchanger 24 when hot water from the engine 12 flows into the heating heat exchanger 24 through the hot water valve 25. Gas refrigerant cooled and radiated in the evaporator 18 is sucked into the compressor 10, and is compressed in the compressor 10.

In the heating mode, heat quantity radiated from the gas refrigerant in the evaporator 18 corresponds to compression operation amount of the compressor 10. Therefore, to increase radiating amount from gas refrigerant in the evaporator 18, it is necessary to increase the compression operation amount of the compressor 10. Thus, in this case, it is necessary to control an amount of refrigerant circulating in the refrigerant cycle at a suitable value. In the embodiment of the present invention, when refrigerant bypasses the condenser 14 during the heating mode, operation of the refrigerant cycle is controlled in accordance with control routine of the flow diagram shown in FIG. 2.

Figure 2:
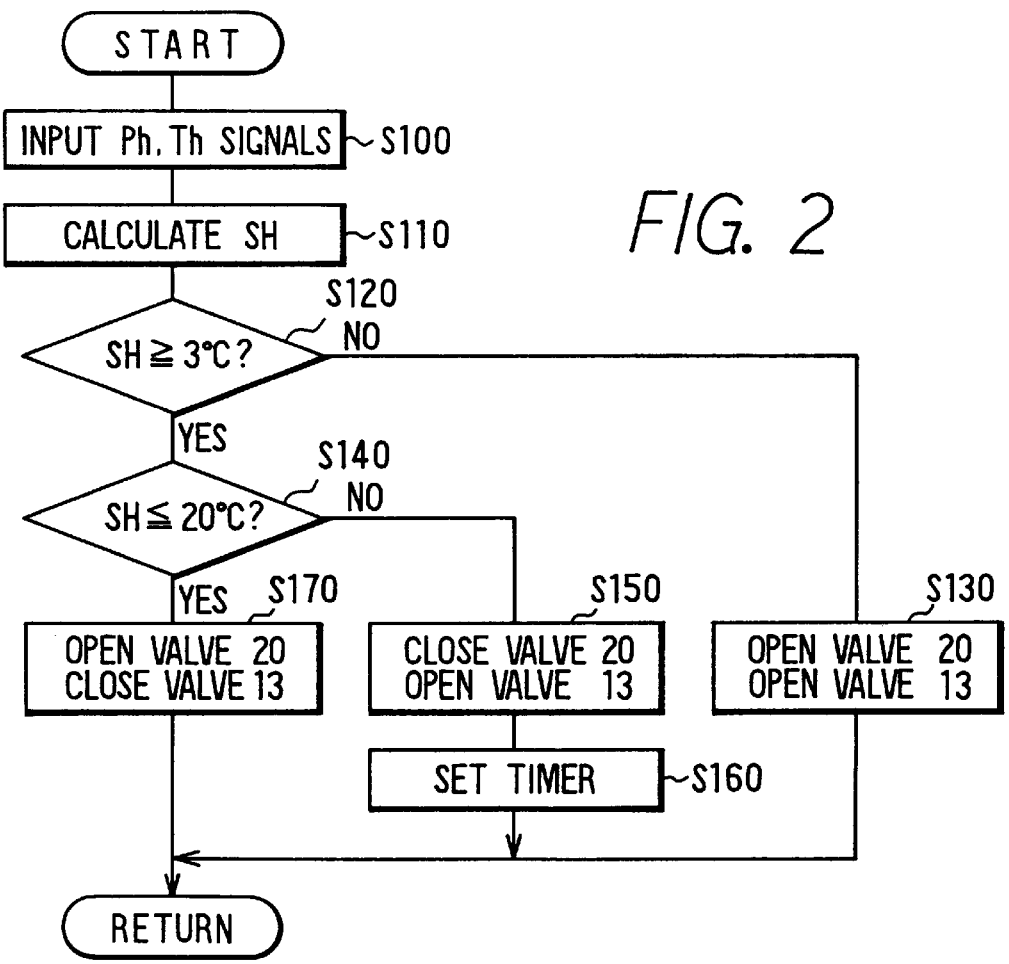
FIG. 2 is a flow diagram for controlling a refrigerant amount circulating in the refrigerant cycle according to the embodiment.

When gas refrigerant bypass mode in which high-temperature gas refrigerant discharged from the compressor 10 bypasses the condenser 14 is selected, the control routine shown in FIG. 2 is started. Next, at step S100, pressure signal "Ph" from the pressure sensor 26 and temperature signal "Th" from the temperature sensor 27 are input. At step S110, the super-heating degree (SH) of gas refrigerant discharged from the compressor 10 is calculated based on the pressure signal "Ph" from the pressure sensor 26 and the temperature signal "Th" from the temperature sensor 27. That is, a super-heating degree map determined based on the pressure and temperature of refrigerant (e.g., R134a) of the refrigerant cycle is pre-stored in a ROM of the ECU 28, and the super-heating degree SH of the gas refrigerant discharged from the compressor 10 is calculated from the map.

Next, as step S120, it is determined whether or not the calculated super-cooling degree SH is equal to or larger than a first set value (e.g., 3° C.). When the super-heating degree SH of the gas refrigerant discharged from the compressor 10 is smaller than the first set value, it is determined that the amount of refrigerant circulating in the refrigerant cycle is excess in the gas refrigerant bypass mode, and both of the first electromagnetic valve 13 and the second electromagnetic valve 20 are opened. Therefore, a part of gas refrigerant discharged from the compressor 10 flows into the condenser 14, is cooled and condensed in the condenser 14. Thus, the amount of refrigerant staying in the condenser 14 is increased, so that the amount of refrigerant circulating in the refrigerant cycle is reduced during the gas refrigerant bypass mode.

Conversely, when the super-heating degree SH calculated at step S120 is equal to or larger than the first set value (e.g., 3° C.), it is determined whether or not the super-heating degree SH is equal to or smaller than a second set value (e.g., 20° C.) at step S140. When the super-heating degree SH is larger than the second set value, it is determined that the amount of refrigerant circulating in the refrigerant cycle is deficient during the gas refrigerant bypass mode, and the first electromagnetic valve 13 is opened and the second electromagnetic valve 20 is closed at step S150. Therefore, refrigerant cycle is generally operated. Thus, condensed liquid refrigerant staying in the condenser 14 is pushed toward the evaporator 18 so that refrigerant from the condenser 14 is introduced into the evaporator 18. The operations of the electromagnetic valves 13, 20 at step S150 is performed until the refrigerant staying in the condenser 14 flows into the evaporator 18. In the embodiment of the present invention, a timer is set at step S160 so that the operations of the electromagnetic valves 13, 20 at step S150 is continued in a predetermined time.

On the other hand, when it is determined that the super-heating degree SH is equal to or smaller than the second set temperature (e.g., 20° C.) at step S140, the first electromagnetic valve 13 is closed and the second electromagnetic valve 20 is opened at step S170, and the gas-refrigerant bypass mode is continued. By the above-described operation control of the first and second electromagnetic valves 13, 20, the amount of refrigerant circulating in the refrigerant cycle can be suitably controlled so that heating capacity during the gas-refrigerant bypass mode becomes maximum.

Figure 3A:
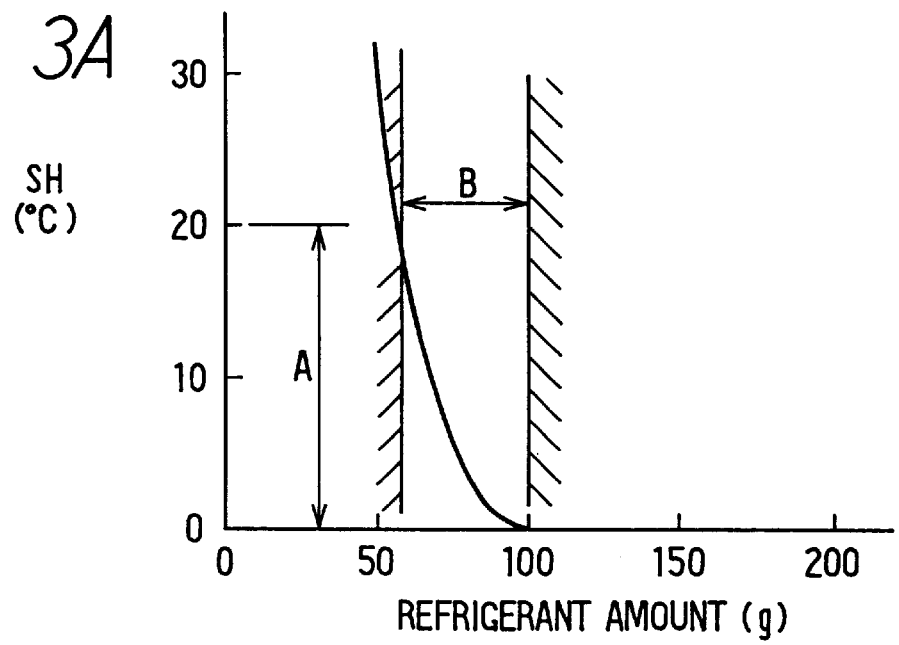
FIG. 3A is a graph showing the relationship between a super-heating degree (SH) of gas refrigerant discharged from a compressor and the refrigerant amount circulating in the refrigerant cycle.
Figure 3B:
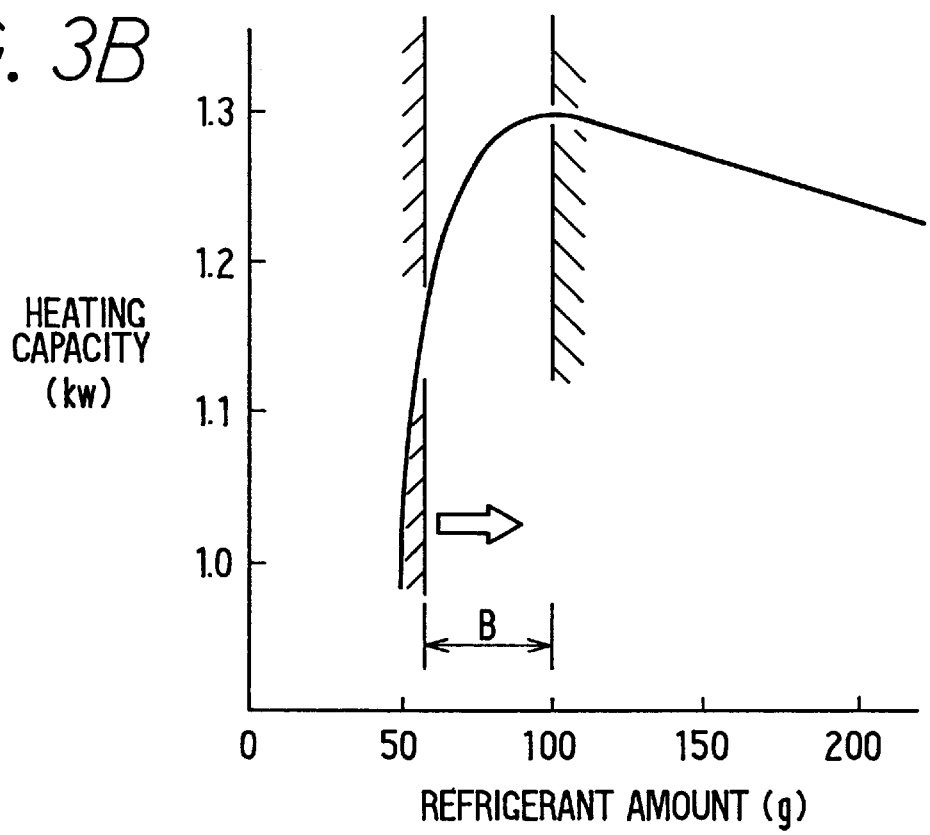
FIG. 3B is a graph showing the relationship between the refrigerant amount circulating in the refrigerant cycle and heating capacity.
Figure 4:
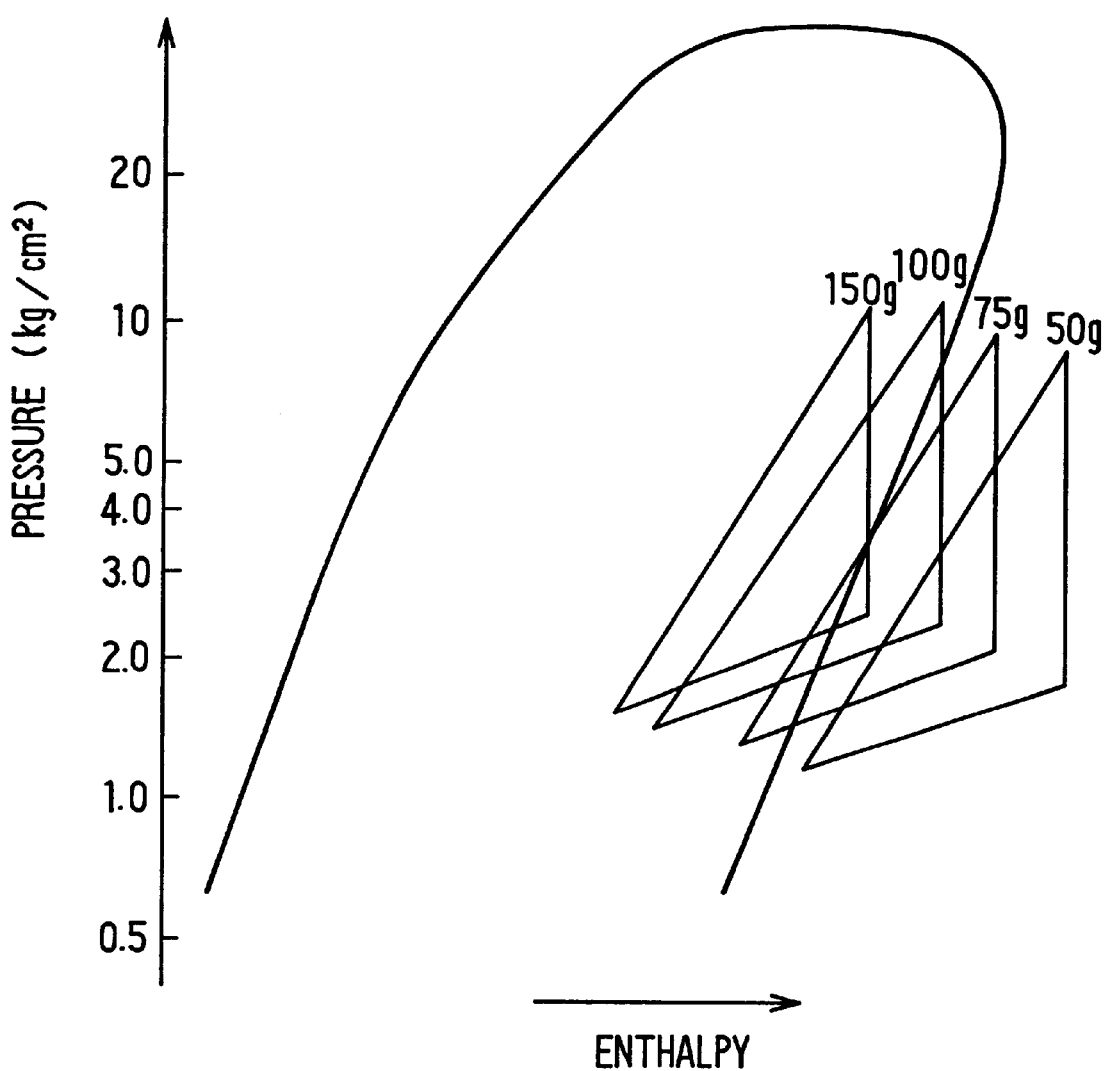
FIG. 4 is a Mollier diagram on which balance points corresponding to the refrigerant amount shown in FIG. 3 are indicated.

The inventors of the present invention experimentally studied the relationship between the super-heating degree SH of gas refrigerant discharged from the compressor and the refrigerant amount circulating in the refrigerant cycle during the gas refrigerant bypass mode shown in FIG. 3A, and the relationship between the heating capacity of the refrigerant cycle and the refrigerant amount circulating in the refrigerant cycle during the gas refrigerant bypass mode shown in FIG. 3B. In the experiments of FIGS. 3A, 3B, an amount of air flowing through the evaporator 18 is set to 350 m³/h, the temperature of outside air is −20° C., a rotation speed of the compressor 10 is set to 1500 rpm. FIG. 4 shows balance points corresponding to the refrigerant amount in FIGS. 3A, 3B, on Mollier diagram.

As shown in FIGS. 3A, 3B, when the super-heating degree SH of gas refrigerant discharged from the compressor 10 is approximately 0° C., the heating capacity of the refrigerant cycle in the gas refrigerant bypass mode becomes maximum. Here, the reason will be now described. When the amount of refrigerant circulating in the refrigerant cycle is increased, suction refrigerant density of the compressor 10 is increased because a part of liquid refrigerant returns to the compressor 10 by the increase of the refrigerant amount circulating in the refrigerant cycle. Therefore, compression operation amount of the compressor 10 is increased, and the heating capacity of the refrigerant cycle during the gas refrigerant bypass mode can be improved. However, when the refrigerant amount circulating in the refrigerant cycle is increased to a predetermined amount, liquid refrigerant is mixed in gas refrigerant at the refrigerant discharging side of the compressor, a rear compression capacity of the compressor is decreased due to the liquid refrigerant; and therefore, the heating capacity of the refrigerant cycle is decreased. That is, in this case, the compression capacity of the compressor is reduced as volume of the liquid refrigerant increases, and the heating capacity of the refrigerant cycle is also reduced. Further, due to compression of the liquid refrigerant, excessive stress may be caused in the compression operation of the compressor 10, and the compressor 10 may be troubled.

Thus, in the embodiment of the present invention, because the super heating degree SH of gas refrigerant discharged from the compressor 10 is controlled in a predetermined range A (e.g., 0° C.–20° C.) shown in FIG. 3A, the refrigerant amount circulating in the refrigerant cycle can be controlled in a predetermined range B (e.g., 60 g–100 g) shown in FIGS. 3A, 3B. Therefore, the heating capacity of the refrigerant cycle can be set to a high level (e.g., 1.2 Kw–1.3 Kw).

As shown in FIGS. 3A, 3B, in the embodiment of the present invention, because the super-heating degree SH of gas refrigerant discharged from the compressor 10 is set to be lower than 20° C., the refrigerant amount circulating in the refrigerant cycle can be controlled to be larger than 60 g, and it can prevent temperature of gas refrigerant discharged from the compressor 10 is excessively increased. On the other hand, because the super-heating degree SH of gas refrigerant discharged from the compressor 10 is set to be higher than 0° C., the refrigerant amount circulating in the refrigerant cycle can be controlled to be smaller than 100 g, and it can prevent a trouble of the compressor 10. However, in the flow diagram shown in FIG. 2, to sufficiently detect and determine the super-heating degree SH, the first set value is set to 3° C., for example.

Although the present invention has been fully described in connection with the preferred embodiment thereof with reference to the accompanying drawings, it is to be noted that various changes and modifications will become apparent to those skilled in the art.

For example, in the above-described embodiment, the pressure sensor 26 and the temperature sensor 27 are used so that the super-heating degree SH is calculated. However, the temperature of gas refrigerant discharged from the compressor 10 is changed to a corresponding pressure, and a member which is displaced according to the corresponding pressure of the temperature and the pressure of refrigerant discharged from the compressor may be disposed. In this case, the displaced amount of the member is changed into an electrical resistant value, and the super-heating degree SH of the gas refrigerant discharged from the compressor may be detected.

In the above-described embodiment, when the refrigerant amount circulating in the refrigerant cycle is deficient (e.g., SH>20° C.), the first electromagnetic valve 13 is opened and the second electromagnetic valve 20 is closed so that refrigerant staying in the condenser 14 is pushed from the condenser 14 toward the evaporator 18. However, when the refrigerant amount circulating in the refrigerant cycle is deficient (e.g., SH>20° C.), both of the first and second electromagnetic valves 13, 20 may be closed. That is, when both of the first and second electromagnetic valves 13, 20 are closed, the refrigerant staying in the condenser 14 can be introduced into the evaporator 18 by the suction operation of the compressor 10. Further, a single valve unit for switching plural refrigerant passages may be used instead of the first and second electromagnetic valves 13, 20.

Further, in the above-described embodiment, the refrigerant cycle is typically applied to the vehicle air conditioner; however, the refrigerant cycle may be applied to various uses.

Such changes and modifications are to be understood as being within the scope of the present invention as defined by the appended claims.

What is claimed is:

1. A refrigerant cycle comprising:
   a compressor for compressing refrigerant, said compressor having a discharge port for discharging refrigerant;
   a condenser for condensing gas refrigerant discharged from said compressor;
   a first press-reducing unit for reducing a pressure of refrigerant from said condenser;
   a heat exchanger for evaporating refrigerant from said first press-reducing unit;
   a bypass duct connected to said discharge port of said compressor and an inlet of said heat exchanger, said bypass duct forming a bypass passage through which refrigerant discharged from said compressor is introduced into said heat exchanger while bypassing said condenser;
   a second press-reducing unit, disposed in said bypass passage, for reducing pressure of refrigerant from said compressor;
   a valve unit for switching a communication between said discharge port of said compressor and an inlet of said condenser, and a communication between said discharge port of said compressor and said bypass passage;
   super-heating signal detecting means for detecting a signal corresponding to a super-heating degree of refrigerant discharged from said compressor; and
   control means for determining said super-heating degree based on the signal from said super-heating signal detecting means, and for controlling said valve unit to control refrigerant amount compressed in said compressor according to said super-heating degree.

2. The refrigerant cycle according to claim 1, wherein said valve unit closes said condenser and opens said bypass passage so that refrigerant discharged from said compressor flows through said bypass passage while bypassing said condenser, during a bypass mode where refrigerant introduced from said compressor into said heat exchanger through said bypass passage is cooled in said heat exchanger.

3. The refrigerant cycle according to claim 2, wherein:
   said valve unit opens said condenser so that a part of refrigerant discharged from said compressor is introduced into said condenser, when said super-heating degree is smaller than a first predetermined value during said bypass mode; and
   said valve unit closes said bypass passage and opens said condenser so that refrigerant staying in said condenser is discharged into said heat exchanger, when said super-heating degree is larger than a second predetermined value larger than said first predetermined value.

4. The refrigerant cycle according to claim 3, wherein said valve unit opens said bypass passage and closes said condenser to set said bypass mode, when said super-heating degree is larger than said first predetermined value and is smaller than said second predetermined value.

5. The refrigerant cycle according to claim 1, wherein said super-heating degree signal detecting means includes a pressure sensor for detecting pressure of refrigerant discharged from said compressor, and a temperature sensor for detecting temperature of refrigerant discharged from said compressor.

6. The refrigerant cycle according to claim 3, wherein:
   said control means includes
      calculating means for calculating said super-heating degree based on the signal from said super-heating signal detecting means, and
      determining means for determining whether or not said super-heating degree calculated by said calculating means is larger than said first predetermined value or is smaller than said second predetermined value; and
   said control means controls said valve unit based on the determination from said determining means.

7. The refrigerant cycle according to claim 3, wherein said control means further includes a timer for continuing to introduce refrigerant staying in said condenser into said heat exchanger in a predetermined time, when said super-heating degree of refrigerant discharged from said compressor is larger than said second predetermined value.

8. The refrigerant cycle according to claim 3, wherein:
   said control means determines that the refrigerant amount compressed in said compressor is excess during said bypass mode, when said super-heating degree is smaller than said first predetermined value; and
   said control means determines that refrigerant amount compressed in said compressor is deficient during said bypass mode, when said super-heating degree is larger than said second predetermined value.

9. The refrigerant cycle according to claim 1, wherein said valve unit includes a first electromagnetic valve for controlling refrigerant amount flowing from said compressor into said condenser, and a second electromagnetic valve for controlling refrigerant amount flowing from said compressor into said heat exchanger through said bypass passage.

10. A refrigerant cycle for an air conditioner having an air conditioning case for forming an air passage through which air flows, said refrigerant cycle comprising:
    a compressor for compressing refrigerant, said compressor having a discharge port for discharging refrigerant;
    a condenser for condensing gas refrigerant discharged from said compressor;

a first press-reducing unit for reducing a pressure of refrigerant from said condenser;

a heat exchanger for evaporating refrigerant from said first press-reducing unit, said heat exchanger being disposed in said air conditioning case;

a bypass duct connected to said discharge port of said compressor and an inlet of said heat exchanger, said bypass duct forming a bypass passage through which refrigerant discharged from said compressor is introduced into said heat exchanger while bypassing said condenser;

a second press-reducing unit, disposed in said bypass passage, for reducing pressure of refrigerant from said compressor;

a valve unit for switching a communication between said discharge port of said compressor and an inlet of said condenser, and a communication between said discharge port of said compressor and said bypass passage;

a pressure sensor for detecting pressure of refrigerant discharged from said compressor;

a temperature sensor for detecting temperature of refrigerant discharged from said compressor; and control means for determining said super-heating degree based on signals from said pressure sensor and said temperature sensor, wherein said control means controls said valve unit to control refrigerant amount flowing from said compressor into said heat exchanger through said bypass passage according to said super-heating degree.

11. The refrigerant cycle according to claim 10, wherein said valve unit closes said condenser and opens said bypass passage so that refrigerant discharged from said compressor flows through said bypass passage while bypassing said condenser, during a bypass mode where refrigerant introduced from said compressor into said heat exchanger through said bypass passage is cooled in said heat exchanger by air passing through said heat exchanger in said air conditioning case.

12. The refrigerant cycle according to claim 11, wherein:

said valve unit opens said condenser so that a part of refrigerant discharged from said compressor is introduced into said condenser, when said super-heating degree is smaller than a first predetermined value during said bypass mode; and said valve unit closes said bypass passage and opens said condenser so that refrigerant staying in said condenser is discharged into said heat exchanger, when said super-heating degree is larger than a second predetermined value larger than said first predetermined value.

* * * * *